United States Patent
Laubscher

(10) Patent No.: US 9,371,232 B2
(45) Date of Patent: Jun. 21, 2016

(54) TREKKKING ATOM NANOTUBE GROWTH

(71) Applicant: Bryan Edward Laubscher, Olympia, WA (US)

(72) Inventor: Bryan Edward Laubscher, Olympia, WA (US)

(*) Notice: Subject to any disclaimer, the term of this patent is extended or adjusted under 35 U.S.C. 154(b) by 0 days.

(21) Appl. No.: 14/037,034

(22) Filed: Sep. 25, 2013

(65) Prior Publication Data

US 2014/0120029 A1  May 1, 2014

Related U.S. Application Data

(63) Continuation-in-part of application No. 13/694,088, filed on Oct. 29, 2012.

(51) Int. Cl.
*C01B 31/02* (2006.01)
*B82Y 30/00* (2011.01)
*B82Y 40/00* (2011.01)

(52) U.S. Cl.
CPC .............. *C01B 31/0226* (2013.01); *B82Y 30/00* (2013.01); *B82Y 40/00* (2013.01)

(58) Field of Classification Search
CPC ................... B01J 19/087; B01J 19/121; B01J 2219/0892; C01B 31/0226; C22C 26/00; B82Y 40/00
USPC ........ 423/447.1–447.3, 445 B; 977/742–754, 977/842–848; 428/367
See application file for complete search history.

(56) References Cited

U.S. PATENT DOCUMENTS

| | | | |
|---|---|---|---|
| 6,755,956 B2 * | 6/2004 | Lee et al. ...................... | 205/104 |
| 7,045,108 B2 | 5/2006 | Jiang | |
| 8,173,211 B2 | 5/2012 | Shaffer | |
| 8,206,674 B2 | 6/2012 | Smith | |
| 2003/0173206 A1 * | 9/2003 | Delaunay ............... | B82Y 10/00 204/164 |
| 2008/0018012 A1 * | 1/2008 | Lemaire .................. | B82Y 30/00 264/82 |
| 2008/0237483 A1 * | 10/2008 | Nguyen et al. ............ | 250/396 R |
| 2009/0252886 A1 * | 10/2009 | Barker .................. | C01B 21/064 427/523 |
| 2012/0171106 A1 * | 7/2012 | Barker et al. .............. | 423/447.3 |

OTHER PUBLICATIONS

Dvorsky, Why we'll probably never build a space elevator, publishbed online at http://io9.gizmodo.com/5984371/why-well-probably-never-build-a-space-elevator on Feb. 15, 2013, p. 1-11.*

* cited by examiner

*Primary Examiner* — Daniel C McCracken

(57) ABSTRACT

Disclosed is a trekking atom nanotube growth technology capable of continuously growing long, high quality nanotubes. This patent application is a Continuation In Part of the Proximate Atom Nanotube Growth patent application Ser. No. 13/694,088 filed on Oct. 29, 2012. The current invention represents a departure from chemical vapor deposition technology as the atomic feedstock does not originate in the gaseous environment surrounding the nanotubes. The technology mitigates the problems that cease carbon nanotube growth in chemical vapor deposition growth techniques:

1) The accumulation of material on the surface of the catalyst particles, suspected to be primarily amorphous carbon,
2) The effect of Ostwald ripening that reduces the size of smaller catalyst particles and enlarges larger catalyst particles,
3) The effect of some catalyst materials diffusing into the substrate used to grow carbon nanotubes and ceasing growth when the catalyst particle becomes too small.

16 Claims, 15 Drawing Sheets

TREKKING ATOM NANOTUBE GROWTH

This patent application is a Continuation In Part of the Proximate Atom Nanotube Growth patent application Ser. No. 13/694,088 filed on Oct. 29, 2012.

BACKGROUND OF THE INVENTION

1. Field of the Invention

The present invention relates to the growth of nanotubes (NTs). The growth is accomplished by transporting the feedatoms of the NT to the catpar of the NT without the atom being chemically bound to a molecule in the atmosphere environment that surrounds the growing nanotube. The current situation can be illustrated by considering the example of CNTs.

Manmade CNTs are created by various means. Consider one of the most useful techniques, chemical vapor deposition (CVD). Basically, the CVD process involves a carbon bearing gas as a constituent of the atmosphere in a reaction chamber. Some of these gas molecules react with a catpar in the chamber and if the temperature, partial gas pressure and many other parameters are correct, a carbon atom from a gas molecule migrates into or onto the surface of the catpar and a CNT will grow out of the catpar. This process is quite popular because the CVD process, in general, has proven to be extremely useful, over many decades, in other endeavors including semiconductor microcircuit fabrication. However, there are drawbacks when this technology is used for CNT growth.

The first drawback is that although initial growth of the CNTs is quite rapid, the growth quickly slows to a crawl and for all intents and purposes stops. Breakthroughs have been made that allow the growth to continue perceptibly, albeit slowly, but a second problem comes into play. The already formed CNTs are immersed in an environment of hot, carbon bearing gasses. Reactions continue on the surface of the CNTs that create imperfections in their highly structured carbon lattice. These imperfections dramatically degrade the physical properties of the CNTs. The longer the growth continues in this environment, the more damage is done to the CNTs. Therefore significant quantities of long ($\geq 1$ centimeter for CNTs, many centimeters for BNNTs), highq CNTs are impossible to fabricate. For over a decade, researchers have been trying to find the "right set" of CVD parameters to produce long, highq CNTs without success.

Causes of the dramatic slowdown of CNT growth during the CVD process are currently understood to include:

1) The accumulation of material on the surface of the catpar, suspected to be amorphous carbon. This coating reduces the surface area of the catpar thereby decreasing the opportunity for carbon atoms, appropriate to combine with the growing CNT, to either pass into the catpar or migrate on its surface to the CNT growth location. Thus CNT growth is slowed or terminated.
2) The effect of Ostwald ripening tends to reduce the size of small catpars and increase the size of large catpars by mass transfer from the small to the large. Conceptually this is because small particles are thermodynamically less stable than larger particles. This thermodynamically-driven process is seeking to minimize the system surface energy. The catpar size is important since CNT growth will cease (or not begin in the first place) if the catpar is too large or too small.
3) Although substrates upon which CNTs are grown can be many different substances, the most common substrate is silicon dioxide, in part because of the decades of experience with it in the semiconductor industry. Silicon dioxide was thought to be impervious to catalyst elements, but in CNT fabrication it has been found that at least some catalyst materials can diffuse into the silicon dioxide layer. Thus the effective size of the catpar gets smaller and can become incapable of supporting CNT growth. Other substrates may be porous to catalyst materials as well.

2. Description of the Prior Art

U.S. Pat. No. 7,045,108 describes the growth of CNTs on a substrate and the subsequent drawing of those CNTs off the substrate in a continuous bundle. The abstract states: A method of fabricating a long carbon nanotube yarn includes the following steps: (1) providing a flat and smooth substrate; (2) depositing a catalyst on the substrate; (3) positioning the substrate with the catalyst in a furnace; (4) heating the furnace to a predetermined temperature; (5) supplying a mixture of carbon containing gas and protecting gas into the furnace; (6) controlling a difference between the local temperature of the catalyst and the furnace temperature to be at least 50 .degree. C.; (7) controlling the partial pressure of the carbon containing gas to be less than 0.2; (8) growing a number of carbon nanotubes on the substrate such that a carbon nanotube array is formed on the substrate; and (9) drawing out a bundle of carbon nanotubes from the carbon nanotube array such that a carbon nanotube yarn is formed.

The technique described in the previous paragraph is a representative example of the popular and useful "forest growth" of CNTs and the drawing of a CNT bundle from the forest. It does not discuss any technique for mitigating the causes for CNT growth slowdown.

U.S. Pat. No. 8,206,674 describes a growth technique for boron nitride nanotubes (BNNTs). From the abstract: Boron nitride nanotubes are prepared by a process which includes: (a) creating a source of boron vapor; (b) mixing the boron vapor with nitrogen gas so that a mixture of boron vapor and nitrogen gas is present at a nucleation site, which is a surface, the nitrogen gas being provided at a pressure elevated above atmospheric, e.g., from greater than about 2 atmospheres up to about 250 atmospheres; and (c) harvesting boron nitride nanotubes, which are formed at the nucleation site.

The above technique forms centimeter long BNNT using laser ablation of the boron into a nitrogen atmosphere. The growth occurs at a rough spot around the ablation crater and the growth streams in the direction of the nitrogen flow. A catalyst material need not be present. The technology does not allow for the control of growth or the use of this laser ablation technology to grow CNTs.

U.S. Pat. No. 8,173,211 describes CVD CNT growth process that is continuous. From the abstract: A method of production of carbon nanoparticles comprises the steps of: providing on substrate particles a transition metal compound which is decomposable to yield the transition metal under conditions permitting carbon nanoparticle formation, contacting a gaseous carbon source with the substrate particles, before, during or after said contacting step, decomposing the transition metal compound to yield the transition metal on the substrate particles, forming carbon nanoparticles by decomposition of the carbon source catalyzed by the transition metal, and collecting the carbon nanoparticles formed.

The technique described in the previous paragraph is the technique in which the catalyst is dispersed into the carbon-bearing gas flow of the reactor. It produces CNTs of up to approximately 0.5 mm in length. The CNTs appear as smoke and can be drawn off continuously. However, the technology has been unable to grow long, highq CNTs.

SUMMARY OF THE INVENTION

The present invention is a technology for growing NTs by transporting the feedatoms of the NT to the catpar of the NT without the atom being chemically bound to a molecule in the atmosphere environment that surrounds the growing NT. Conceptually, various mechanisms can be used to transport feedatoms to the catpar with the proper energy to combine with the growing NT. One possible embodiment, shown in FIG. 1, is to fabricate a substrate with a layer of feedstock atoms as a surface, then liberate these atoms from the surface below a catpar using a pulse of radiation incident upon the bottom of the substrate that is transported to the feedstock layer by a wavide in the substrate. The parameters of the radiation pulse and wavide properties can be used to ensure that the feedatoms arrive at the catpar with the appropriate energy to facilitate the process that results in the feedatoms being incorporated into the NT growing from the catpar.

The present invention circumvents unwanted, extraneous chemical reactions that occur at the catpar and the NT that arise from the gasses comprising the atmosphere in the reaction chamber, by eliminating the need for reactive gasses. Once freed of the requirements for supplying the feedatoms, the interatmo of the reaction chamber can be controlled to promote the growth of highq NTs and their processing into a final form.

The present invention includes the recognition that enabling the growth of highq, long ($\geq 1$ centimeter for CNTs, many centimeters for BNNTs) NTs represents a fundamental breakthrough. With such a technology, industrial processing of long and highq NTs is within reach. Moreover, industrial production for nanotubes will lower the cost and increase the availability of nanotubes to allow a materials revolution on Earth. This materials revolution will enable the use of nanotubes in high strength materials, electrical conductors, semiconductors, electrical components, electrical micro and nano circuits, and sensors. The most extreme example of the benefits may be that high strength CNT materials will enable the Space Elevator, thereby opening the resources of space to mankind in the form of enhanced Earth observation, space-based solar power, asteroid mining, planetary defense and colonization of the moons and planets of our solar system!

DETAILED DESCRIPTION OF THE INVENTION

1. Definitions

Atomgun—When used herein shall mean an atomic or molecular ion source capable of accelerating ionized feedatoms to energies sufficient to transport them to the catpar, such that they arrive with the optimum energy to become a part of nanotube fabrication: an atom gun. In some cases the atomgun may also be used to accelerate catalyst particles.

BNNT—When used herein shall mean a boron nitride nanotube.

Catpar—When used herein shall mean a volume of catalyst material, wherein the size, shape and elemental constituents are appropriate for growing a nanotube: a catalyst particle. The catalyst may contain one or more elemental constituents.

CNT—When used herein shall mean a carbon nanotube.

Emrad—When used herein shall mean electromagnetic radiation, however generated and of appropriate wavelength, to stimulate CNT growth within the technique being described.

Feedatom—When used herein shall mean an atom or molecule that is a chemical constituent of a nanotube: the atomic feedstock of a nanotube.

Feedlayer—When used herein shall mean a layer of NT feedstock atoms (feedatoms) that may comprise other constituents such as catalyst material.

Feedvoir—When used herein shall mean a reservoir of NT feedstock atoms (feedatoms) that may contain other constituents such as catalyst material.

Highq—When used herein shall mean nearly defect free: high quality. A highq NT is a nanotube that is nearly pristine, perfect and defect free. As such its tensile strength and electrical properties are maximal.

Ineratmo—When used herein shall mean the inert, gaseous atmosphere in a CNT growth chamber: an inert atmosphere. If the sides of the substrate are isolated then it refers to the atmosphere on the nanotube growth side (front side) of the substrate. This "inert" atmosphere generally is made up of inert gasses. However, if partial pressures of other gasses, including ones introduced to react with NTs, catpars and/or free carbon, are introduced into the atmosphere during the growth process, the term interatmo still applies.

NT—When used herein shall mean a nanotube.

Plasmon—When used herein shall mean a quantum of plasma oscillation. This includes all types of plasmons and polaritons such as exciton-polaritons and surface plasmon polaritons. In the context of the current invention, under the right conditions, electromagnetic energy can be transformed at a surface into plasmons capable of propagating the energy through a medium.

Figure 2:
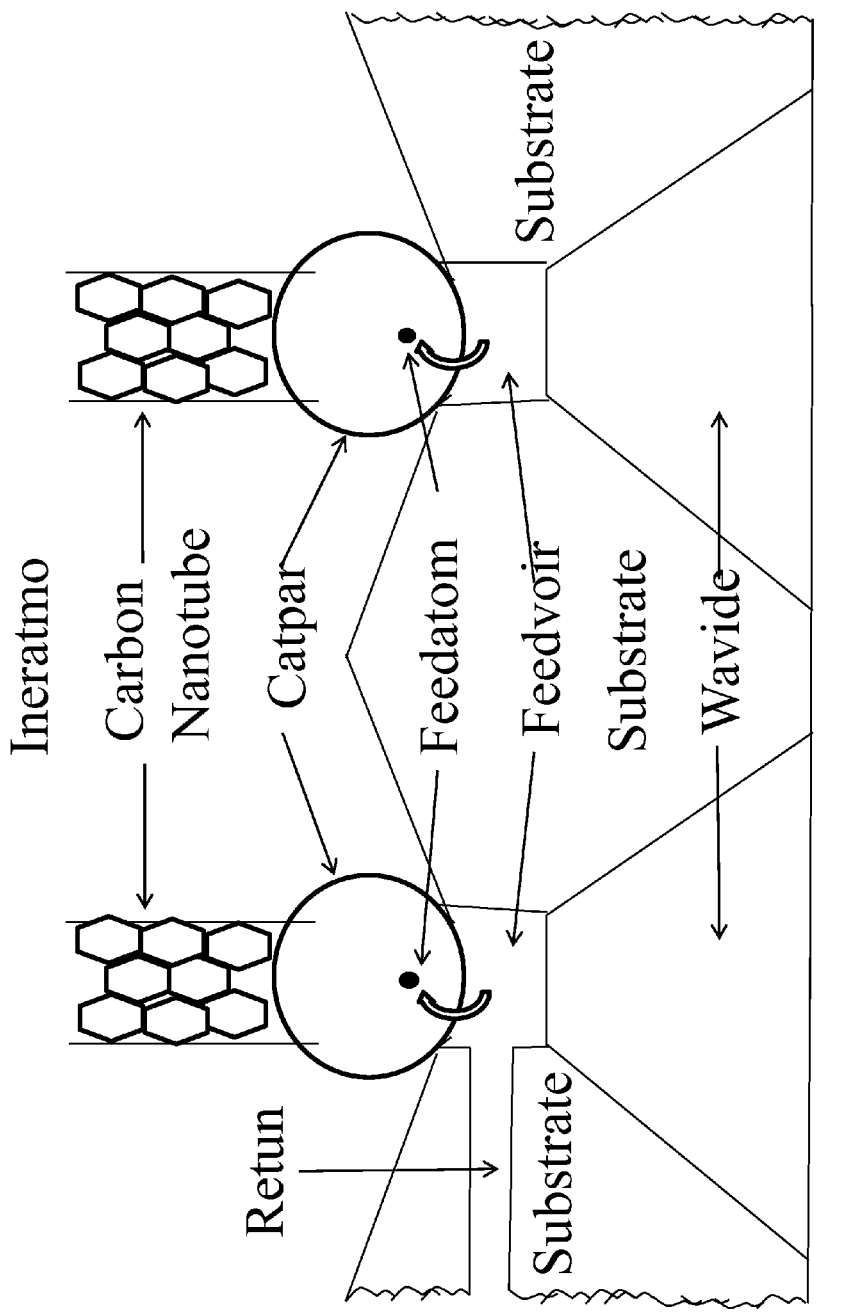
FIG. 2 is the feedvoir (FV) embodiment of the present invention wherein a feedvoir below the catpar and above the wavide provide the feedatoms for the CNT growth.

Retun—When used herein shall mean a replenishment tunnel or other structure in a substrate or wavide that facilitates the replenishment of feedatoms, catalyst material, and/or other materials for NT growth. FIG. 2 illustrates a notional retun.

Figure 3:
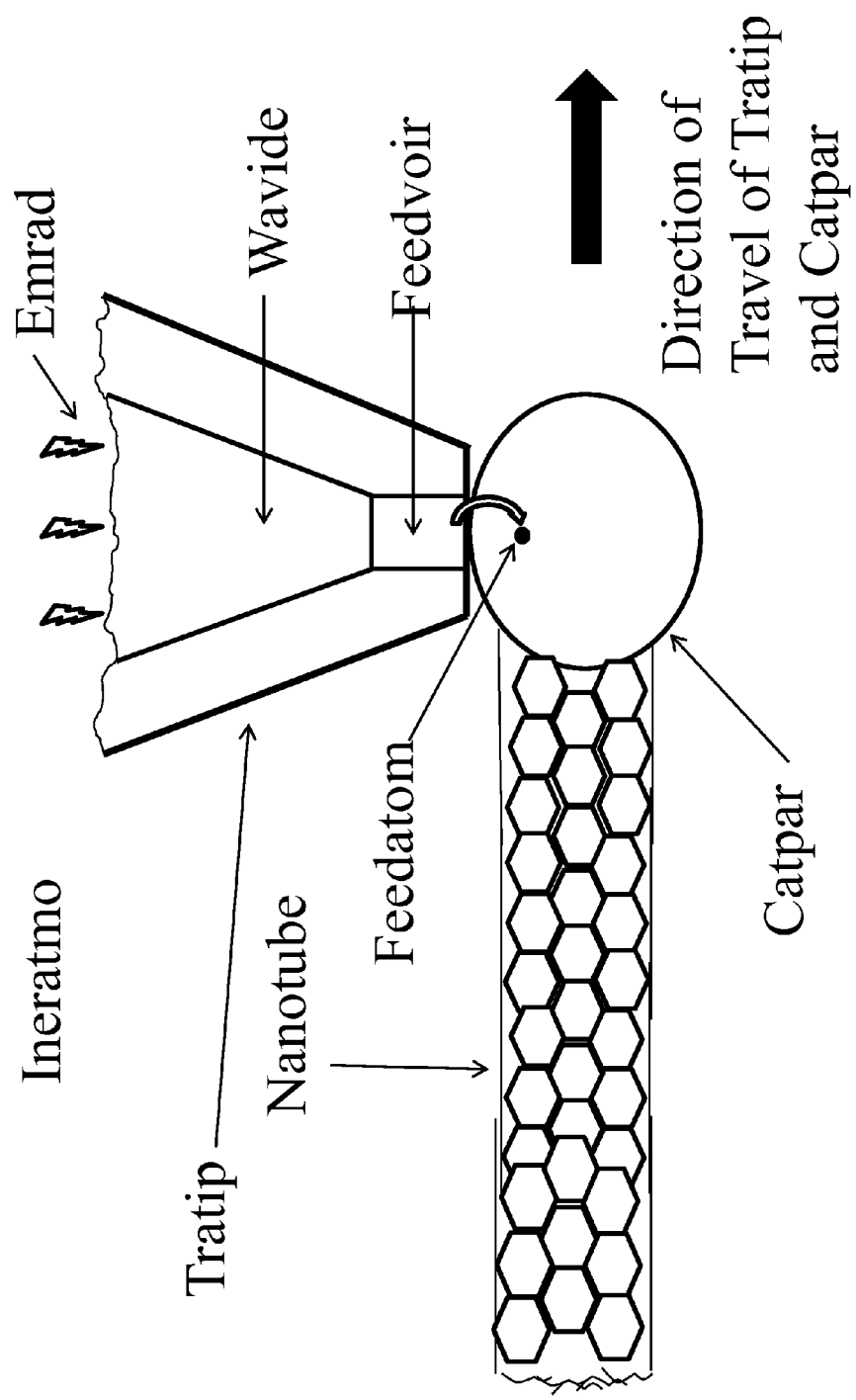
FIG. 3 is the wavide tratip (WT) embodiment of the present invention wherein emrad stimulated NT growth is accomplished using a tratip.
Figure 9:
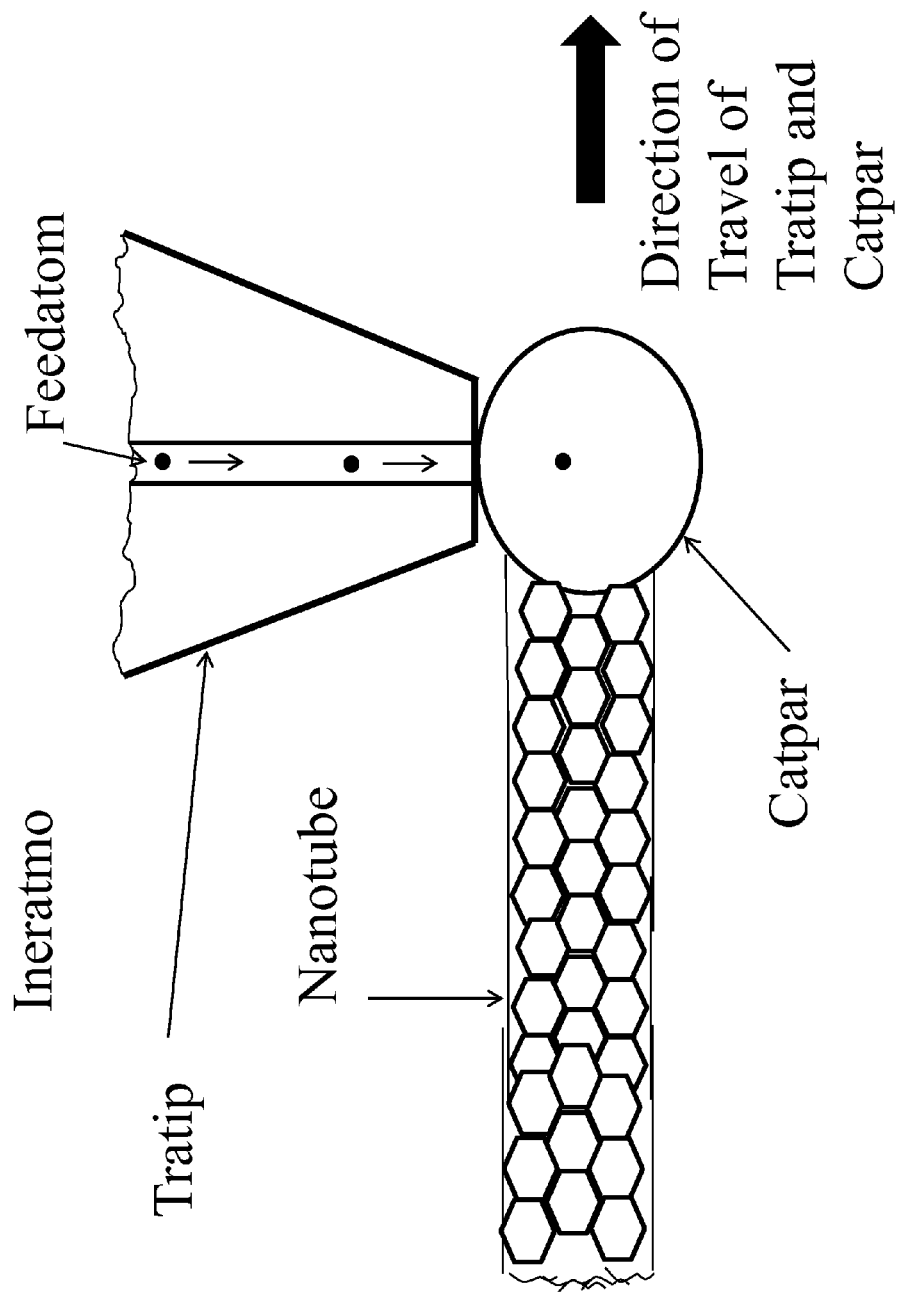
FIG. 9 is the ballistic tratip (BT) embodiment of the present invention wherein feedatom acceleration NT growth is accomplished using a tratip.
Figure 11:
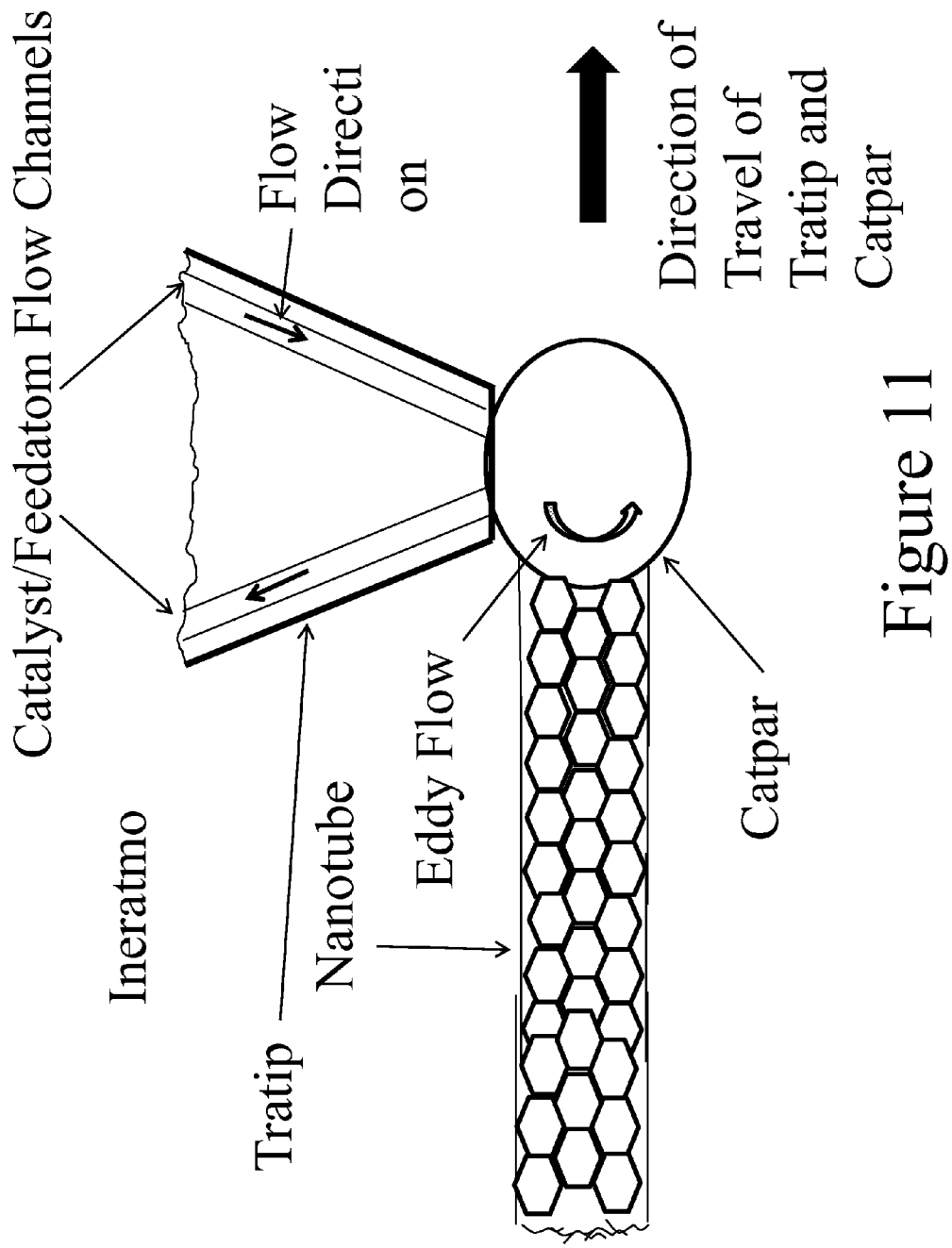
FIG. 11 is the flow tratip (FT) embodiment of the present invention wherein catalyst flow NT growth is accomplished using a tratip.

Tratip—When used herein shall mean a traveling micro or nanoscale platform or tip. An NT is grown from a catpar attached to the end of the tratip, a moveable platform. The platform or tip is a part of a cantilever or other support structure that facilitates the movement of the nanoscale NT growing system. Thus the NT may be grown vertically, horizontally or at an angle to enable structured CNT growths to be fabricated. A tratip is analogous to the sensing tip of an atomic force microscope which is attached to a cantilever. FIGS. 3, 9 and 11 illustrate tratips. Alternatively, the tratip could be stationary and the target surface or volume, upon which the NT growth is being deposited, could be mobile.

Trek—When used herein shall mean the process or processes by which a feedatom travels from a feedlayer or feedvoir to a catpar after being energized. Trekking is the verb form of trek.

Wavide—When used herein shall mean a waveguide through a substrate that transports energy in the form of emrad or plasmons.

2. Best Mode of the Invention

Figure 1:
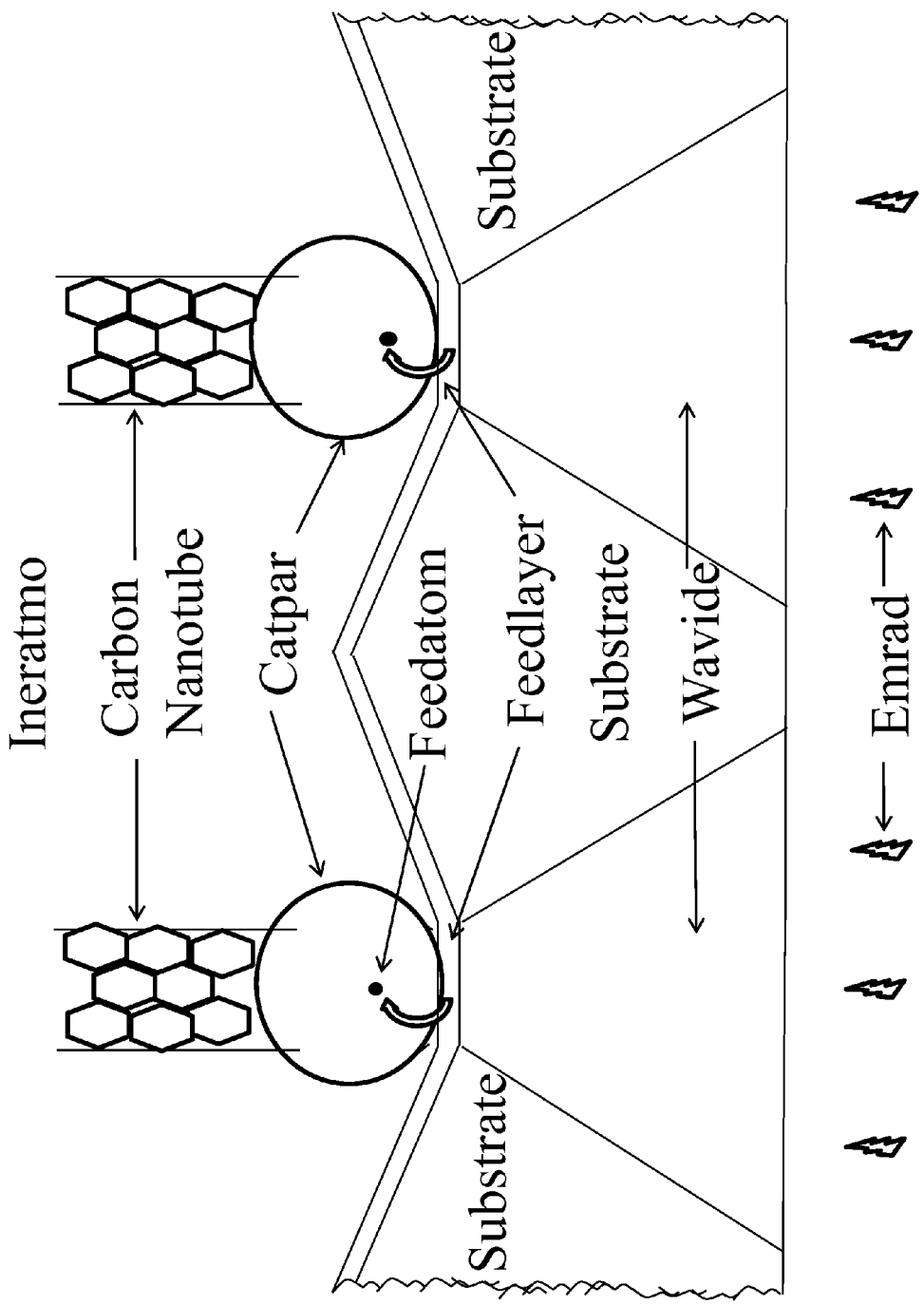
FIG. 1 is the best mode of the Trekking Atom Nanotube Growth according to the present invention, also named the BM embodiment.

FIG. 1 illustrates the best mode contemplated by the inventor of Trekking Atom Nanotube Growth according to the present invention.

3. How to Make the Invention

Emrad and Plasmon Techniques

In a reaction chamber, the system shown in FIG. 1, which illustrates the best mode (BM embodiment), grows NTs. Emrad incident on the bottom of the substrate is coupled into the wavide fabricated as part of the substrate. The energy of the emrad, either in the form of electromagnetic radiation or as plasmons is transported along the wavide to the feedlayer. This energy stimulates some of the feedlayer feedatoms to trek (shown by the arrow) into the catpar growing an NT. The feedatoms are transported to the catpar with an optimal energy for becoming a part of the NT growing from the catpar. Unwanted, extraneous chemical reactions are mitigated because the NTs grow in an ineratmo environment. The substrate is contoured to concentrate the catalyst and position the catpar. The substrate material is a surface impervious to the catalyst material so the catalyst will not migrate through the surface. The ineratmo's constituent gasses and physical characteristics can be chosen to mitigate unwanted, extraneous chemical reactions and support the growth process yielding highq NTs.

FIG. 2 illustrates the feedvoir (FV) embodiment of the current invention which comprises a feedvoir sitting between the catpar and wavide instead of a feedlayer. The larger the feedvoir, the more feedatoms, catalyst material and/or other materials are available for NT growth. Sizing these feedvoirs or the amount of material deposited in feedvoirs enables the tailoring of the growth of NTs, including tailoring the length of the NTs resulting from a given growth run.

One of the feedvoirs in FIG. 2 illustrates a retun through the substrate for replenishing the feedatoms, catalyst material and/or other materials for NT growth. This represents a variation of the FV embodiment wherein retuns facilitate the replenishment of feedatoms, catalyst material and/or other materials for NT growth from another reservoir. This reservoir would most probably be off the substrate on which the NTs are growing. In this way, continuous NT growth may be accomplished, especially in the case of industrial-scale growth in a manufacturing environment.

FIG. 3 illustrates the wavide tratip (WT) embodiment of the current invention comprising a catpar residing on a tratip. The feedatom delivery system is the same as in the BM (FIG. 1) and FV (FIG. 2) embodiments. In this case the tratip can grow the NT while on the move, enabling growth of an NT in three dimensions. Such capability facilitates the fabrication of nano and microscale electronic components or other patterned devices and structures. If a catpar becomes fouled, or in any way becomes non-operational, it could be replaced during a growth run. Note that the feedvoir could be replaced by a feedlayer for a variation of this embodiment.

The substrate, emrad and wavide system properties can be used to tune the amount of energy delivered to the feedlayer or feedvoir. These properties include the substrate contour, thickness and material properties (such as index of refraction); the emrad intensity, wavelength of radiation and pulse duration; and the wavide properties (such as index of refraction, absorption, etc.) and shape. Indeed as seen schematically in FIGS. 1-3, the wavide's funnel shape concentrates the emrad's energy thereby increasing the energy density presented to the feedlayer directly above the wavide. In FIGS. 1 and 2, one wavide for each catpar is shown, however, a wavide might encompass many catpars, delivering energy to the feedlayers or feedvoirs and stimulating the feedatoms to trek into the catpar.

The emrad may be generated by laser, light emitting diode (LED), fluorescent or incandescent flashlamp or other illumination technology. An LED, nanolaser and/or nano optical amplifier may be fabricated separately or as part of the substrate as a source or part of a source of emrad. In the case the LED, nanolaser and/or nano optical amplifier are fabricated as a part of the substrate, the wavide could in all or in part be the LED, laser or optical amplifier cavity. Structures such as gratings may be fabricated onto the substrate to facilitate the coupling of emrad into the wavide.

A feature of the BM (FIG. 1), FV (FIG. 2) and WT (FIG. 3) embodiments is that NT growth may be paused or ceased by stopping the emrad. This could allow the fine tuning of NT length or a way to accurately begin and end different stages of NT growth in a multi-stage growth scenario.

Because of the very small nanoscale size of the wavide, the emrad energy coupling into and transport along the wavide may require plasmon processes. In that case the wavide structure may be a series of surfaces, parallel to the energy transport flow upon which surface plasmons can be induced. Moreover, the use of metallic nanoparticles within the wavide may be fabricated to support plasmon creation and hence energy flow through the wavide. Structures such as gratings may be fabricated onto the substrate to facilitate the coupling of emrad energy into plasmon modes in the wavide.

A variation of the delivery of the energy through the wavide by plasmons is the direct generation of plasmons by direct electrical stimulation. One method uses a metal grating structure laid down on a quantum well. Current injection into the quantum well creates electron-hole pairs which generate plasmons. The metal grating couples the plasmons (and the energy they carry) into the wavide or directly into the feedlayer or feedvoir. In the present invention, the plasmons propagate to the feedatom location and stimulate some of these feedatoms to trek into the catpar. This removes the emrad stimulation component of plasmon energy delivery.

The constituents of the material filling the feedlayers and feedvoirs may include feedatoms, catalyst and/or any other material needed for NT growth or processing. In this way, catalyst released will replenish any catalyst lost through Ostwald ripening or by the catpar diffusing into the substrate. Indeed, if the catpar diffuses slightly into the feedlayer or feedvoir, then the transport of feedatoms to the NT may be enhanced and growth rate of the NT may increase as long as the catpar size can support NT growth. The feedlayer depth and feedvoir volume could be designed for a given substrate to control the length of the NTs grown by that substrate.

Feedatom Acceleration Techniques

In a reaction chamber, the AB (FIG. 4) embodiment of the present invention grows NTs. An atomgun fires, through a tunnel in the substrate, feedatoms of the proper energy, into a catpar growing an NT. The feedatoms are transported to the catpar with an optimal energy for becoming a part of the NT growing from the catpar.

Figure 4:
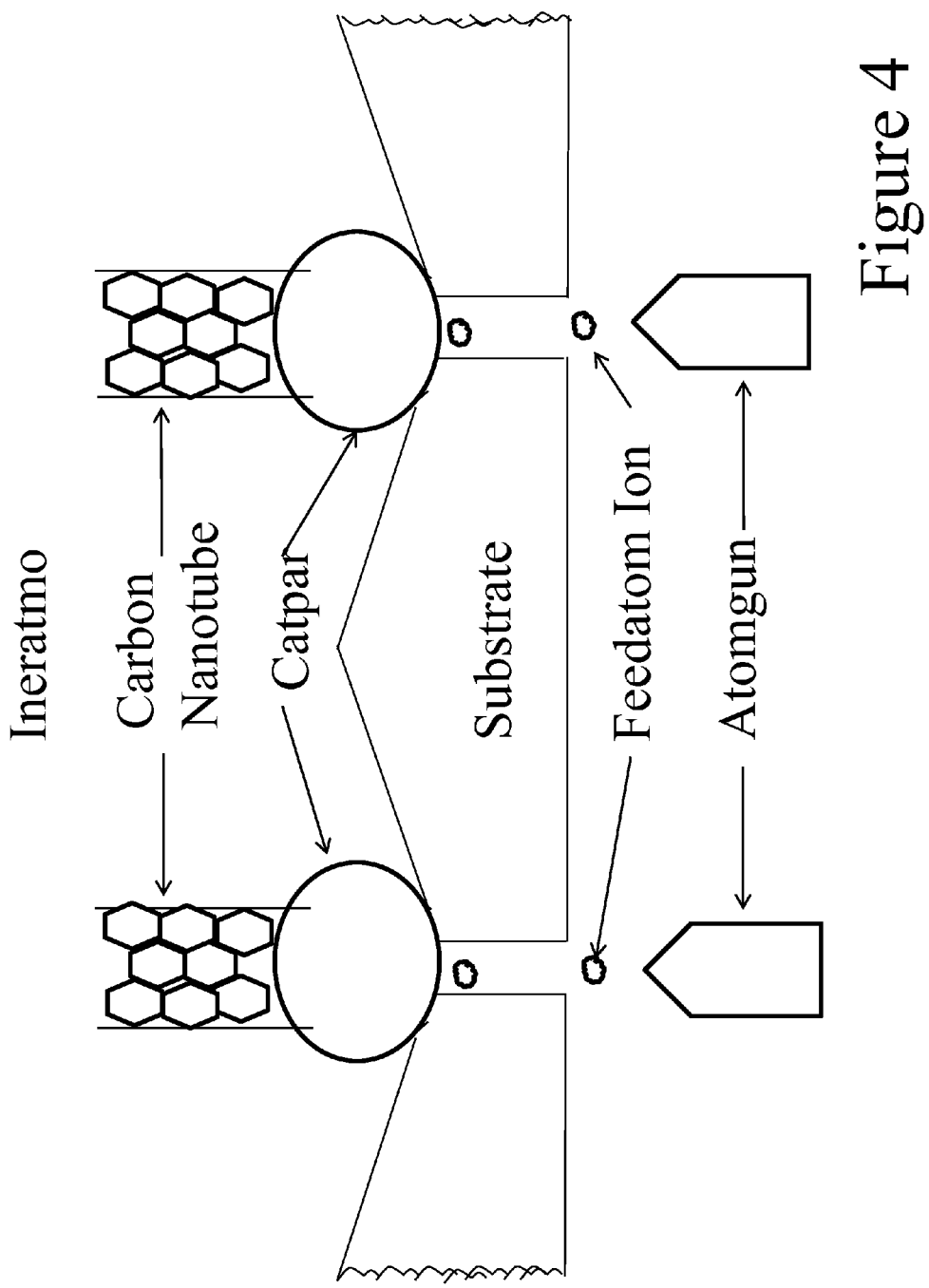
FIG. 4 is the atomgun (AB) embodiment of the present invention wherein an atomgun is used to deliver the feedatoms to the catpar through a small tunnel in the substrate.

The atomgun is an ion source; an electromagnetic apparatus used to ionize and accelerate charged particles. In the AB (FIG. 4) embodiment, ionized feedatoms are transported to the tunnel entrances on the back side of the substrate by the acceleration provided by an atomgun. Requirements for these components of the current invention include the ability to create nearly monoenergetic ions, the capability to steer the beam of ionized feedatoms to the back of the substrate and sufficiently high current of ions to satisfy the growth requirements of the NTs. In FIG. 4, one atomgun is shown notionally for each tunnel! In reality one atomgun is envisioned as providing feedatoms to many, many tunnels.

Ion sources are usually capable of accelerating more than just one atomic species. Therefore, it can be imagined that different ions could be accelerated into the catpar by the atomgun, or other acceleration technologies. Other ions might replenish catalyst material, alter the composition of the catpar to optimize or control growth and/or supply two different elements of feedatoms as in the case of the boron and nitrogen atoms of a BNNT.

When accelerating ions in an atmosphere, it is important to minimize the distance that the ions traverse in the atmosphere and the pressure of the atmosphere. The energy spread of the ions (through collisions) and the probability of atoms being scattered out of their path increases as the distance and pressure increase. Therefore, the backside atmosphere, which may be the interatmo or may be separated from the front side interatmo, will be kept at the minimal possible pressure and the distances the feedatom ions must travel will be kept to a minimum. If the substrate can support the pressure difference, the backside could be held as a vacuum.

The diameter of the tunnel openings at the substrate are smaller than the catpar diameter but on the order of one nanometer to tens of nanometers. The tunnels may be shaped in various ways other than cylinders if desired. Surface tension in the catpar allows it to straddle the tunnel.

Another version of the AB (FIG. 4) embodiment could incorporate a thin film across the upper tunnel surface that could support the catpar. Moreover, a thin film across either the front (ineratmo) and/or back (atomgun environment) sides of the substrate could isolate these sides and act as a barrier to catalyst diffusion into the substrate. In this case, the feedatoms would require extra energy to penetrate the thin film and would emerge into the catpar with a range of energies since the energy loss of a particle through a thin film is a statistical process. Nonetheless, by tuning the peak of the energy distribution to the optimal energy of a feedatom, NT growth may continue.

Figure 5:
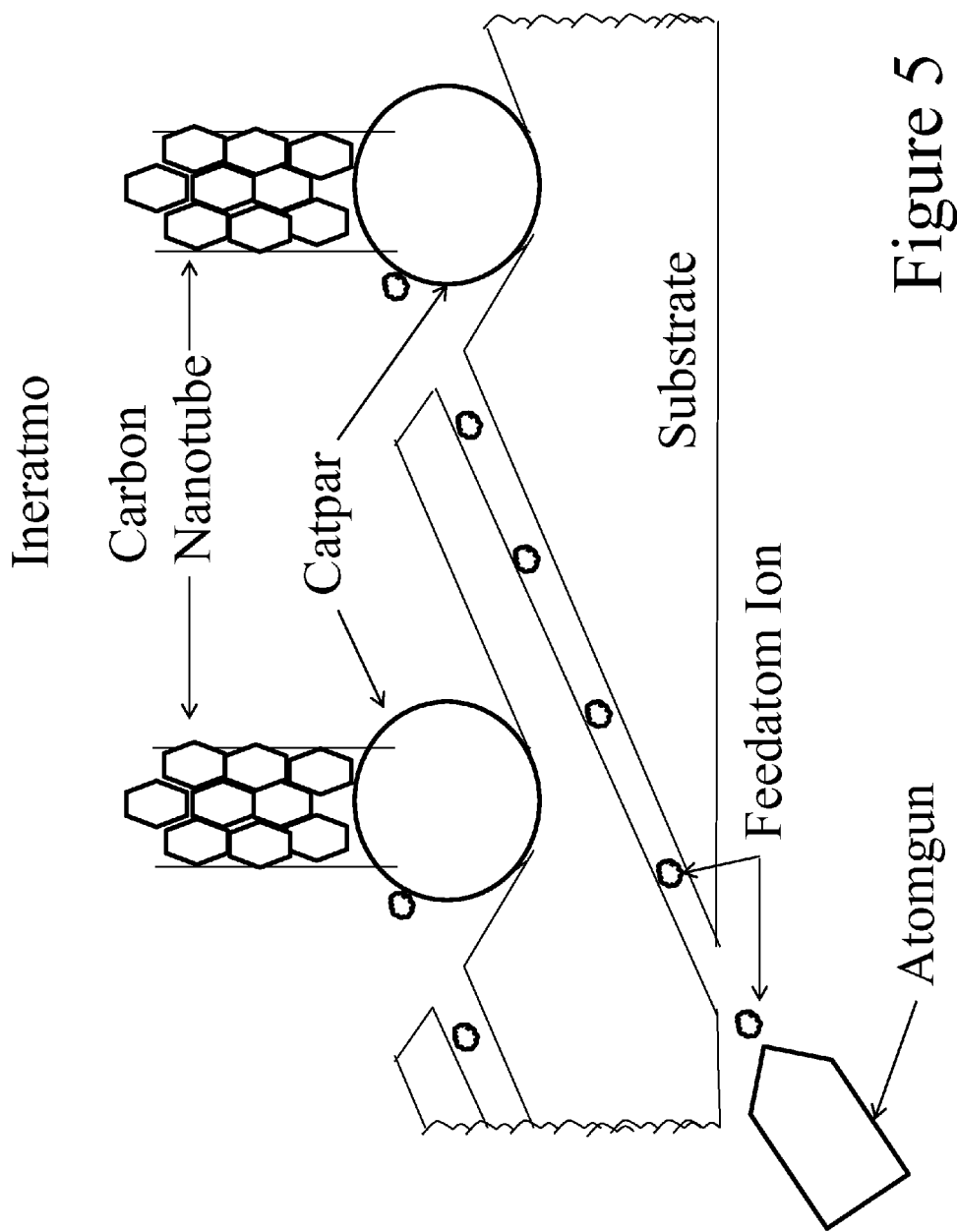
FIG. 5 is the angled atomgun (AA) embodiment of the present invention wherein the tunnel runs at angle other than 90 degrees from the substrate plane.

FIG. 5 illustrates the angled atomgun (AA) embodiment of the current invention in which the tunnels traverse the substrate at an angle not normal to the substrate plane and offset from the catpar. In the case that the surface tension of the catpar is insufficient to straddle the tunnel through the substrate or for other reasons, the tunnel can be formed as shown in FIG. 5, enabling the physical process of transporting the feedatoms of the optimal energy to the catpar growing an NT through a tunnel angled toward the catpar.

Figure 6:
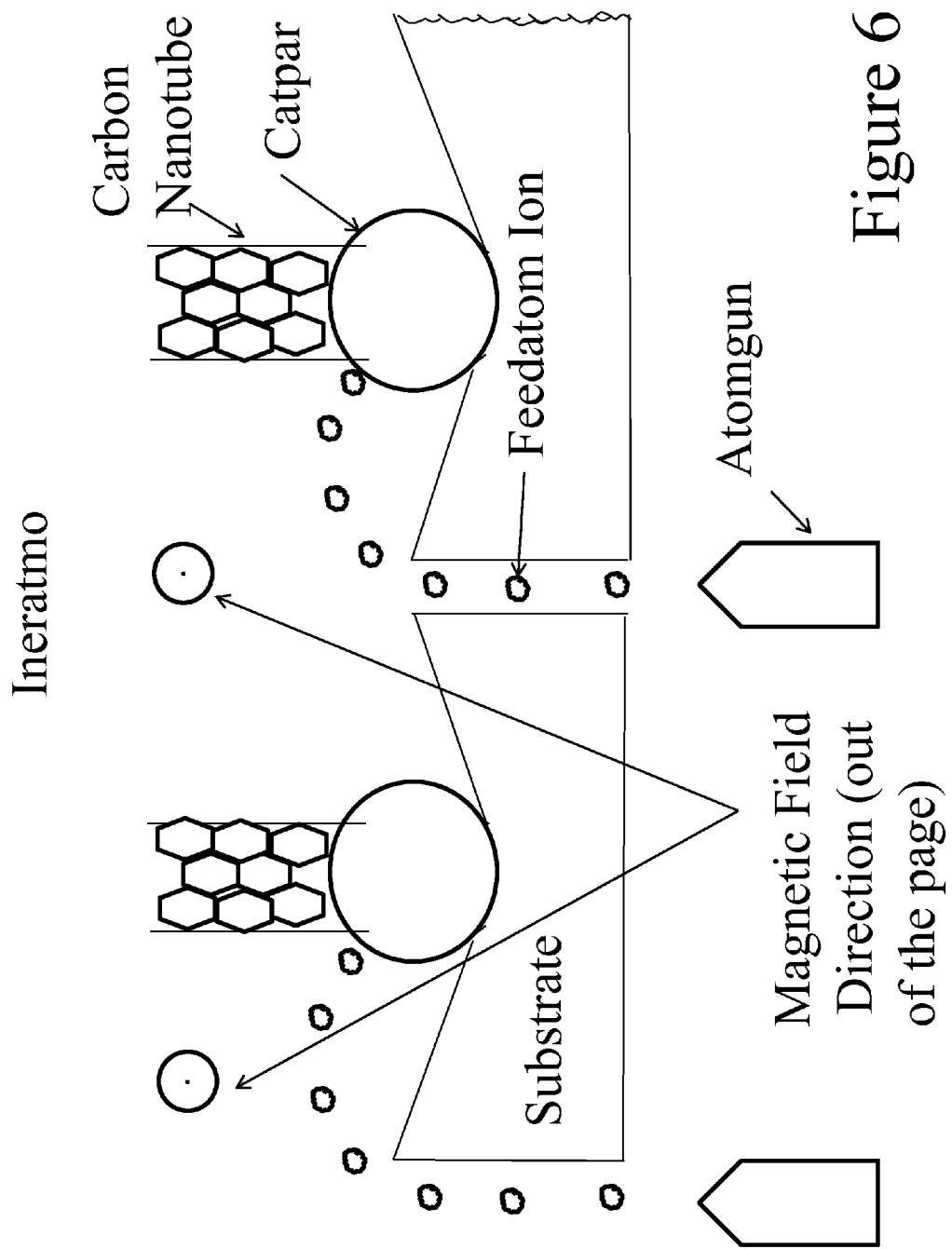
FIG. 6 is a magnetic atomgun (MA) embodiment of the present invention wherein the tunnel is 90 degrees from the substrate plane; but not under the catpar; and magnetic fields are used to accelerate the feedatoms to the catpar.

FIG. 6 illustrates the magnetic atomgun (MA) embodiment of the current invention in which the catpar once again does not straddle the tunnel. In the case that the surface tension of the catpar is insufficient to straddle the nanoscopic tunnel through the substrate or for other reasons, the tunnel can be formed as shown in FIG. 6. Note that the angle of the tunnel need not be 90 degrees with respect to the substrate surface. A magnetic field can be used in the front side of the substrate to accelerate the ionized feedatoms, emerging from the tunnel, in an arc to the catpar. In this case the feedatom velocity and magnetic field magnitude and direction must be matched to bring the feedatoms to the catpar. Electric fields or a combination of electric and magnetic fields may also be used to accelerate the ionized feedatoms to the catpar.

Figure 7:
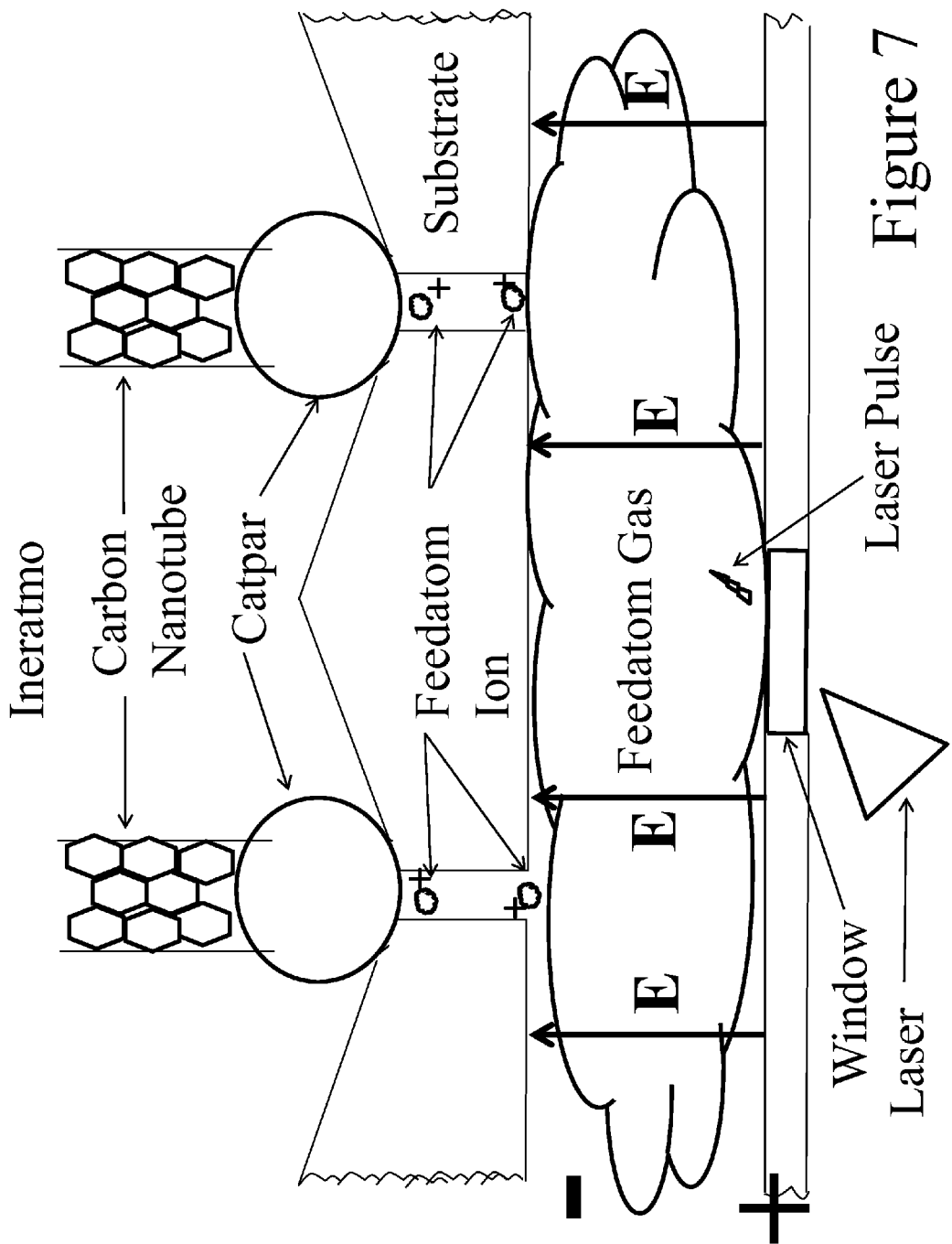
FIG. 7 illustrates the ionizing laser (IL) embodiment of the present invention wherein a laser and an electric field are used to propel the feedatoms to the catpar.

FIG. 7 illustrates the ionizing laser (IL) embodiment of the present invention. In this version, the atomgun is replaced by ionizing and accelerating mechanisms that uses the substrate. For example, the backside of the substrate (or a coating on the substrate) acts as a negative "electrode plate" of the accelerating mechanism, and another surface (or a coating on the surface) spaced farther behind the substrate acts as the positive electrode plate. Feedatom or feedatom bearing gas fills the volume in between. A laser or other illumination device, fires ionizing radiation into the feedatom gas through a window and creates some feedatom ions. An electric field is applied, and the positively charged feedatom ions are accelerated toward the backside of the substrate. A few ions are accelerated into the tunnels and impact the catpar. The laser may be pulsed or continuously operated, and the electric field could be pulsed or constantly applied. The laser, feedatom gas, and electric field properties and application may be adjusted to optimize continuous NT growth. The gas could comprise feedatoms and other constitutents that would optimize NT growth. For example, a noble gas that will not be ionized by the radiation wavelength may be added to maintain a desired pressure. Other embodiments may use another ionization method and/or combine electric and/or magnetic fields to accelerate the feedatom ions to the catpar.

Figure 8:
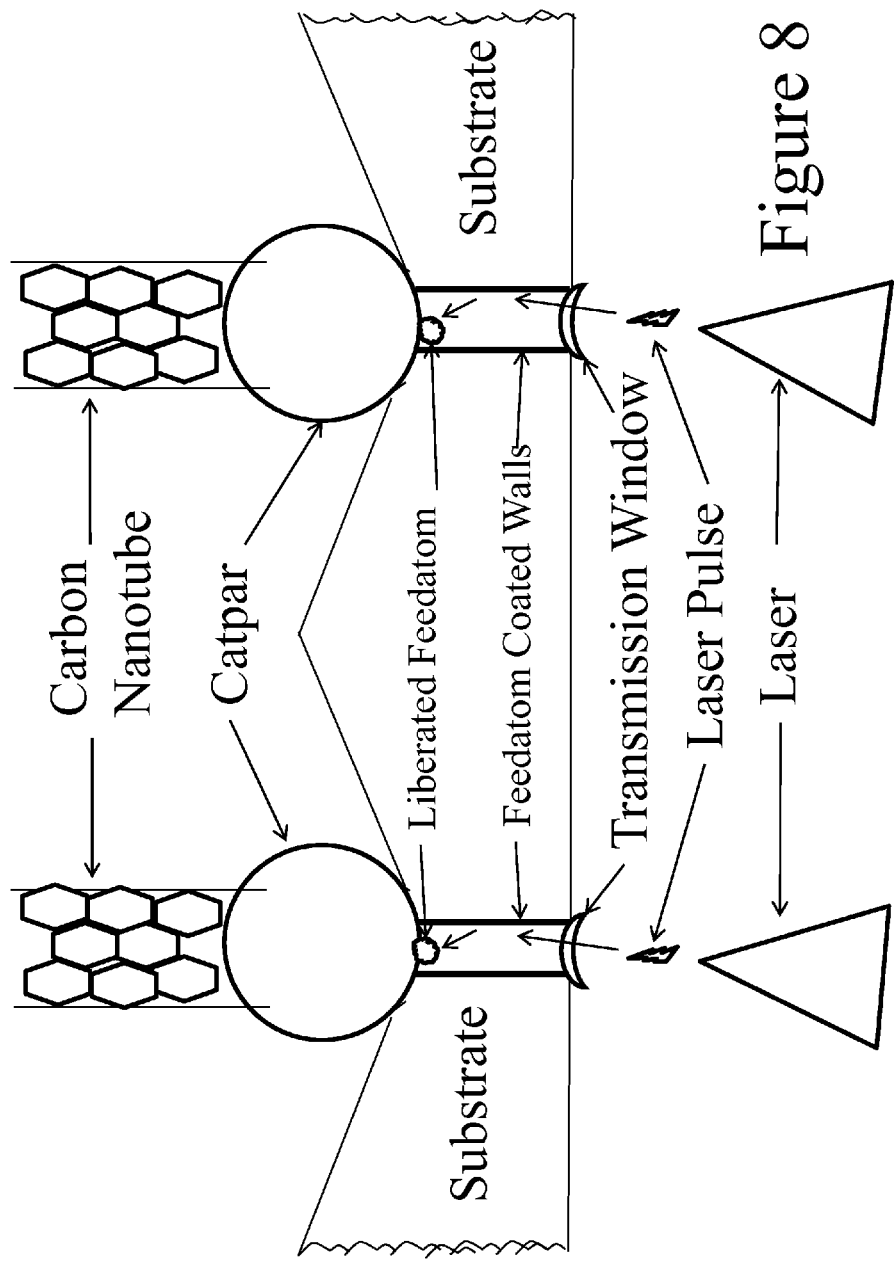
FIG. 8 illustrates the ablation laser (AL) embodiment of the present invention wherein a laser ablates the feedatoms off a surface and to the catpar.

FIG. 8 illustrates the ablation laser (AL) embodiment of the present invention. A laser, or other illumination device, fires through a transmission window to the surface of the tunnel that has been coated with feedatoms. The laser pulse ionizes a number of feedatoms on the tunnel surface and liberates them from the surface. Some of these feedatoms impinge on the catpar and supply the nanotube growth. The laser may be pulsed or continuous wave. The cadence of the laser pulses is adjusted to maintain a sufficient supply of feedatoms to the growth site. Indeed, laser power, pulse length and wavelength as well as the geometry of the tunnel can be adjusted to optimize the feedatoms transported to the catpar.

The energy of these feedatoms is not as controlled as in other embodiments since laser ablation creates a plasma of high temperature. Nonetheless, the catpar will mediate the feedatom's energy and these feedatoms may feed the catpar's NT growth. Also, the transmission window could be a sheet of transmissive material on the bottom of the substrate. This transmissive window or surface could be used to isolate the backside of the substrate from the front side and tunnels, separating the laser environment from the reaction chamber environment. One embodiment of this approach is to eschew the transmissive window altogether and have the laser fire into the tunnel directly.

FIG. 9 illustrates the ballistic tratip (BT) embodiment of the present invention. This is the feedatom acceleration tratip version of the WT (FIG. 3) embodiment. Any of the accelerating mechanisms in the AB (FIG. 4), AA (FIG. 5), MA (FIG. 6), IL (FIG. 7) or AL (FIG. 8) embodiments may be used to accelerate the feedatoms down the tunnel into the catpar at the end of the tratip. Except for its feedatom delivery system, its operation and capabilities are similar to the WT (FIG. 3) embodiment.

One feature of the AB (FIG. 4), AA (FIG. 5), MA (FIG. 6), IL (FIG. 7), AL (FIG. 8) and BT (FIG. 9) embodiments is that NT growth may be paused or ceased by stopping the atomgun or laser operation. This could allow the fine tuning of NT length or a way to accurately begin and end different stages of growth in a multi-stage growth scenario.

Catalyst Flow Techniques

Figure 10:
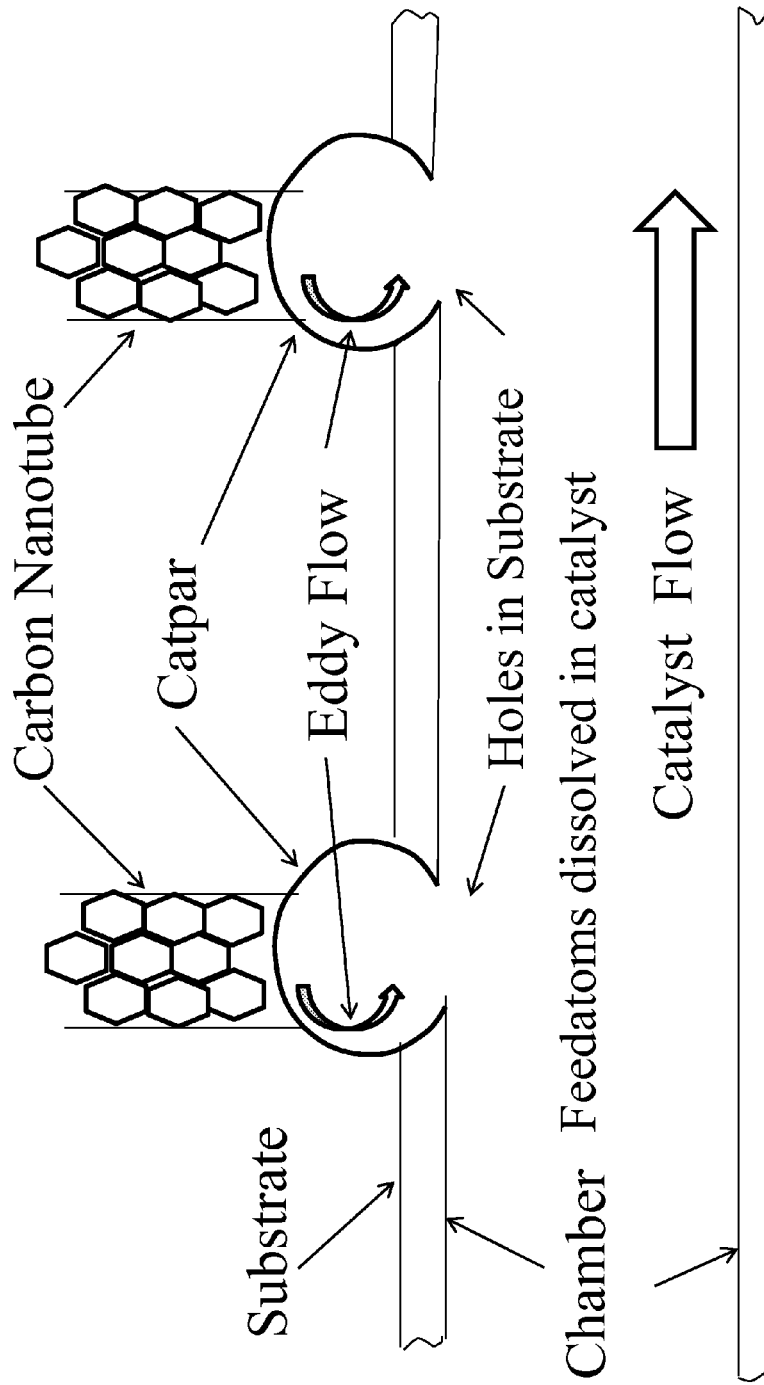
FIG. 10 is the catalyst flow (CF) embodiment of the present invention in which feedatoms are transported to the catpar as a constituent of a catalyst flow.

FIG. 10 illustrates the CF embodiment of the current invention, wherein catalyst material bearing dissolved feedatoms flows in a chamber the top of which is the substrate. A molten catalyst flows in the chamber. Catpars are created by adjusting the pressure slightly to force catalyst through holes in the top of the chamber. The pressure within the flow and in the ineratmo can be adjusted separately or concurrently to create catpars. Feedatoms are dissolved in the catalyst in a precisely controlled process not shown in the figure. As the nanotube growth depletes the feedatom in the catpar catalyst, the depleted catalyst is replaced with feedatom rich catalyst by an eddy current set up by the flow passing underneath the catpar. Additionally, diffusion of feedatoms from the flowing, feedatom-rich, catalyst reservoir will bring feedatoms into the catpar. The temperature of the catpars and concentration of feedatoms can be adjusted to optimize NT growth.

The dimensions of the chamber may be nanoscopic, microscopic or macroscopic. Indeed the chamber can be of any cross section geometry as long as it provides for catalyst flow and tunnels (nominally on top) through which the catpars may be forced. Note that in this embodiment, the eddy flow is enhanced as the tunnel is shortened.

FIG. 11 illustrates the flow tratip (FT) embodiment of the present invention. This is the catalyst flow tratip version of the WT (FIG. 3) embodiment. The catalyst flow of the CF (FIG. 10) embodiment also delivers new feeatoms to the catpar on the tratip in the FT embodiment. Such a flow system, present in the FT tratip, can additionally be used to manage the catpar, including changing the size, replenishing lost catalyst and re-forming a catpar if the previous one is removed either by accident or design. Indeed, WT and BT (FIG. 9) embodiments could be enhanced with a flow system to manage the catpar as well. Except for its feedatom delivery system, the FT operation and capabilities are similar to the WT embodiment.

A feature of the CF (FIG. 10) and FT (FIG. 11) embodiments is that NT growth may be paused or ceased by stopping the flow, although the cessation of growth might not be as abrupt as in the other embodiments. This could allow the fine tuning of NT length or a way to accurately begin and end different stages of NT growth in a multi-stage growth scenario.

Characteristics of all Techniques

The contoured substrate is useful for initially gathering catalyst atoms that form the catpar onto the favored growth site directly above the wavide, feedvoir or tunnel. In the catalyst flow case, the contoured surface is not as important but could still help to contain the catpar material. On the substrate bottom, a reflective surface may be placed on the areas outside the wavides so that unwanted heat is not coupled into the substrate from the emrad. Note that in the tratip embodiments (WT, FIG. 3 BT, FIG. 9 and FT, FIG. 11), no catpar alignment issues are expected since the catpar must be attached or deposited onto the tratip directly. Another embodiment of the current invention is to use a flat substrate.

The substrate can be heated or cooled to optimize the nanotube growth at the catpar. Also, mitigation of Ostwald ripening may require a cooled substrate. Techniques to accomplish this thermal control of the substrate include conduction, convection with the interatmo, radiation from above or below and to a lesser extent from losses from the feedatom delivery systems in the wavide or substrate. Note that the WT (FIG. 3), BT (FIG. 9) and FT (FIG. 11) embodiments are not expected to have an Ostwald ripening problem although the stability of the catpar on the tratip may be of concern. The cooling of the substrate in the CF (FIG. 10) and FT (FIG. 11) embodiments, may allow the catpar to be in a slightly different state, that is, cooler than the flowing catalyst, thereby improving the conditions for NT growth.

Because the Trekking Atom Nanotube Growth technology does not require a hot environment to facilitate the chemical reactions inherent in chemical vapor deposition CNT growth, the temperature of the growth environment might be very different, probably lower. A lower temperature would decrease, possibly dramatically, Ostwald ripening. A different temperature might open up the possibilities for catalysts to an even larger number than are now available for CNT growth.

The catpar could be heated by electromagnetic radiation, probably from above, by radiation tuned to the catalyst material absorption and/or the catpar size to maximize absorption by the catpar. In this way local heating of the catpar is maximized. The catpar may be heated by the energetic feedatoms, which lose their energy to the catpar as they become a part of the growing NT. This enables a temperature differential between the catpar and substrate.

The ineratmo mitigates extraneous reactions from atmospheric gasses. Because the feedatoms for NT growth do not come from the atmospheric gasses; the constituent gasses, pressure and temperature of the atmosphere can be adjusted to suppress mechanisms that hinder NT growth. For example, in the case that the substrate heating maintains the catpar and NT growth site optimum temperature, the temperature and pressure of the atmosphere may be lowered to limit the energy of atmosphere-borne free atoms and molecules capable of bonding to the NT or catpar. The atmosphere gasses may be circulated, filtered, exchanged, monitored and/or changed to facilitate control of the constituents, temperature and pressure, thereby maintaining an optimal atmosphere in the reaction chamber. Finally, the atmosphere can be altered during growth process as required to continue growth, change NT characteristics, and/or functionalize NTs.

The atmospheres present at the nanotube growth side (front) and opposite side (back) of the substrate can be identical or composed of different constituent gasses and have different physical properties as long as barriers are present to separate the atmospheres and the catpar, and its NT growth is not disrupted.

The ineratmo may be modified by the introduction of gasses at any time during the growth process. One embodiment comprises using gasses to functionalize the growing or already grown NTs before they are removed from the growth environment. In this process, the functionalizing chemicals would be introduced into the ineratmo to chemically bond to the NTs for specific uses or further processing. The composition, temperature and pressure of the ineratmo may be altered to facilitate the functionalization reactions. Moreover, functionalized NTs may be accomplished by altering the materials and/or properties of the feedstock, feedstock transport, substrate, catalyst, and catpar.

The ability to clean and recondition the substrate or tratip between growth runs, including stripping and reapplying a feedlayer; stripping and replenishing feedvoirs; flushing a substrate surface by flooding with a catalyst flow; stripping the residue from the substrate backside after a growth run; clearing the tunnels and surfaces after a growth run; and reapplying catalyst material enable the efficient industrial process to grow NTs. Moreover, the greater control of the growth process afforded by all of embodiments of the present invention, facilitate the industrialization of the process.

Prudent choice of the substrate, substrate thin film, catalyst material(s), catpar, ineratmo or combination of these materials and their physical properties may mitigate the dissolution of the catalyst material into the substrate, thereby enabling continued NT growth. This unwanted diffusion shrinks the effective size of the catpar and stops NT growth Accurate and precise control of the chemical reaction that forms NTs is enabled by the control of the feedatoms onto the catpar surfaces and/or into the catpars as well as the environment within which the reaction is taking place. This environment includes the ineratmo composition, temperature, pressure and density as well as the catpar composition, temperature, pressure and density. Moreover, the various feedatom transport methods to the catpar of the different embodiments and environmental control enable the suppression of other, unwanted chemical reactions, such as amorphous carbon that can stop CNT growth.

The accurate and precise control enabled by the growth technique facilitates the maintaining or changing of growing NT properties, such as NT diameter and chirality, during the growth process. The control may be accomplished by altering one or more of the materials and/or physical properties of the feedatoms, feedatom transport, substrate, catalyst, catpar, and/or ineratmo. Thus NTs of novel properties could be produced and tailor-made to specific applications. One example is to constantly increase the catpar size (within limits that permit continued growth) during a growth run so that the NT may undergo transitions to larger diameters.

Real time diagnostic measurements may be employed to measure and control the growth and functionalization of NTs. These diagnostics include the NT growth rate and structure; catalyst temperatures, pressures and compositions; feedatom transport; and ineratmo compositions, temperatures and pressures.

Trekking Atom Nanotube Growth technology may also be used to grow assemblages of atoms thereby forming molecules, structures, shapes and machines in an accurate and controlled manner. These assemblages of atoms include crystals, allotropes of an element, polymorphisms of compounds, polymers, minerals, metals, and polyamorphisms of amorphous materials. These processes may or may not require a catalyst to facilitate the formation of the assemblage.

The examples outlined in the present invention have all included the transport of a feedatom to a catpar. Control of feedatom transport at the sub-nanoscopic level and with precise energy and orientation, will enable fundamental building processes both catalytic and independent of a catalyst. In this case, the feedatoms are transported to an atomic, target site with the optimum energy distribution and orientation to promote bonding at its precise atomic position and with its intended bond(s) in the assemblage of atoms. The construction of designed structures will open up possibilities for materials science, physics, chemistry, medicine, biology, electronics/electromagnetics, optics, agriculture, and industrial and consumer products that are now undreamt.

4. EXAMPLES

The technologies required for the creation of the wavide and tunneling techniques in the present invention exist or are subjects of active research and development. These include:

1) Fabrication of waveguides in semiconductors and other materials.
2) Laying down layers of atoms/molecules onto surfaces to form a feedlayer.
3) Laying down atoms/molecules and populating a feedvoir.
4) Coupling of electromagnetic radiation in materials, including semiconductors.
5) Coupling of electromagnetic energy into plasmon modes in materials, including semiconductors.
6) Semiconductor laser technology and the fabrication of these lasers as a part of devices.
7) Generation of plasmons by direct current injection, including using quantum wells as a medium for the conversion
8) "Traveling tips" such as in an atomic force microscope.
9) Laser drilling techniques;
10) Focused ion beam drilling;
11) Forming boules (in analogy with microchannel plate fabrication but at smaller scales) with a microscopic tube pattern filled with sacrificial material, drawing these structures to the level that the tubes are of nano-scopic cross section, thin slicing the boules transverse to the tubes, then etching away the sacrificial material with a plasma torch.
12) Creating a forming die out of CNT material through patterned growth and subsequent manipulation, forming a ceramic material around the CNT forming die, and destructively removing CNT forming die material with a plasma torch.

Technique #12 above is also a possible approach to creating the chamber illustrated in FIG. 10. The die would be formed as two separate pieces. A forest growth of CNTs (on a substrate that can survive the processing and be removed) is the forming die for the top surface with nanoscopic holes. A second piece is a cylindrical assembly of CNTs for the flow chamber. These two assemblies would be combined and the ceramic material formed over them, forming the ceramic flow chamber volume and its top surface with tiny holes. Finally, the CNT forming die (and substrate) would be removed, probably with a plasma torch that leaves the ceramic undamaged.

Generally, rough surfaces are easier to produce than flat, smooth surfaces. Thus there are many ways to make rough substrates. However, if the contoured surface structure is important then a controlled way to create the contours of the substrate surface may be used. One possible example is to use laser ablation. Indeed, one could create an ablation "crater" and then drill a hole through the bottom of the crater. This could be accomplished by first defocusing slightly the laser beam to ablate the crater and then focusing and collimating the beam to drill a hole through the substrate. In this case the drilling process may be seen as sequentially blasting many little craters vertically until the substrate is penetrated. The same crater technique could be used for wavide/feedvoir siting by excavating the wavide/feedvoir at the crater and depositing the wavide/feedvoir material into the excavation.

The surface of the substrate may have any one of various wavide and/or hole patterns. An array of regularly spaced wavides/holes could be chosen to grow NTs in bulk whereas a particular pattern could be used to fabricate: 1) electronic components and circuits; 2) single sensors and arrays; 3) receivers, rectennas or electromagnetic radiation emitting structures; 4) surface geometries to promote or prevent biological growth; 5) surfaces with special optical, reflective, interference or diffractive properties; 6) surfaces to promote or prevent chemical reactions; 7) structures with certain material properties including strength, hardness, flexibility, density, porosity, etc.; and 8) surfaces that emit particles such as electrons under electrical stimulation (field emission). Note that in the FV (FIG. 2) embodiment the feedvoirs will be formed above the wavides as well.

Continuous replenishment of feedatoms to the catpars growing NTs and the mitigation of the phenomena that stop NT growth described by the various emdobiments above enables continuous growth of NTs. This continuous growth enables the industrialization of bulk NT growth as well as patterned NT growth described in the previous paragraph. Specifically, the retun variation of the FV (FIG. 2) embodiment facilitates continuous replenishment of the feedstock and other materials for NT growth.

5. How to Use the Invention

In the research laboratory, the Trekking Atom Nanotube Growth technology will enable researchers to grow large amounts of long, highq NTs thereby stimulating research into the properties of the NTs and the macroscopic assemblages formed using these materials. In the case of CNTs these properties include very high tensile strength, high thermal conductivity, for some chiralities low conductivity and the ability to sustain very high electrical current densities, and for other chiralities semiconductor properties. In the case of BNNTs, interesting properties include high tensile strength, high thermal conductivity, low electrical conductivity and neutron absorption based upon the presence of boron. Indeed, the long, highq NTs may reveal properties and applications that are not possible with the currently available NTs. Moreover, the long, highq nanotubes can be used to construct: 1) enhanced strength structures; 2) enhanced conductivity conductors, wires, microscale and nanoscale integrated circuits, microscale and nanoscale transistors, diodes, gates, switches, resistors, capacitors, single sensors and arrays; 3) receivers, rectennas or electromagnetic radiation emitting structures; 4) surface geometries to promote or prevent biological growth; 5) surfaces with special optical, reflective, interference or diffractive properties; 6) surfaces to promote or prevent chemical reactions; 7) structures with certain material properties including strength, hardness, flexibility, density, porosity, etc.; and 8) surfaces that emit particles such as electrons under electrical stimulation (field emission).

Figure 12:
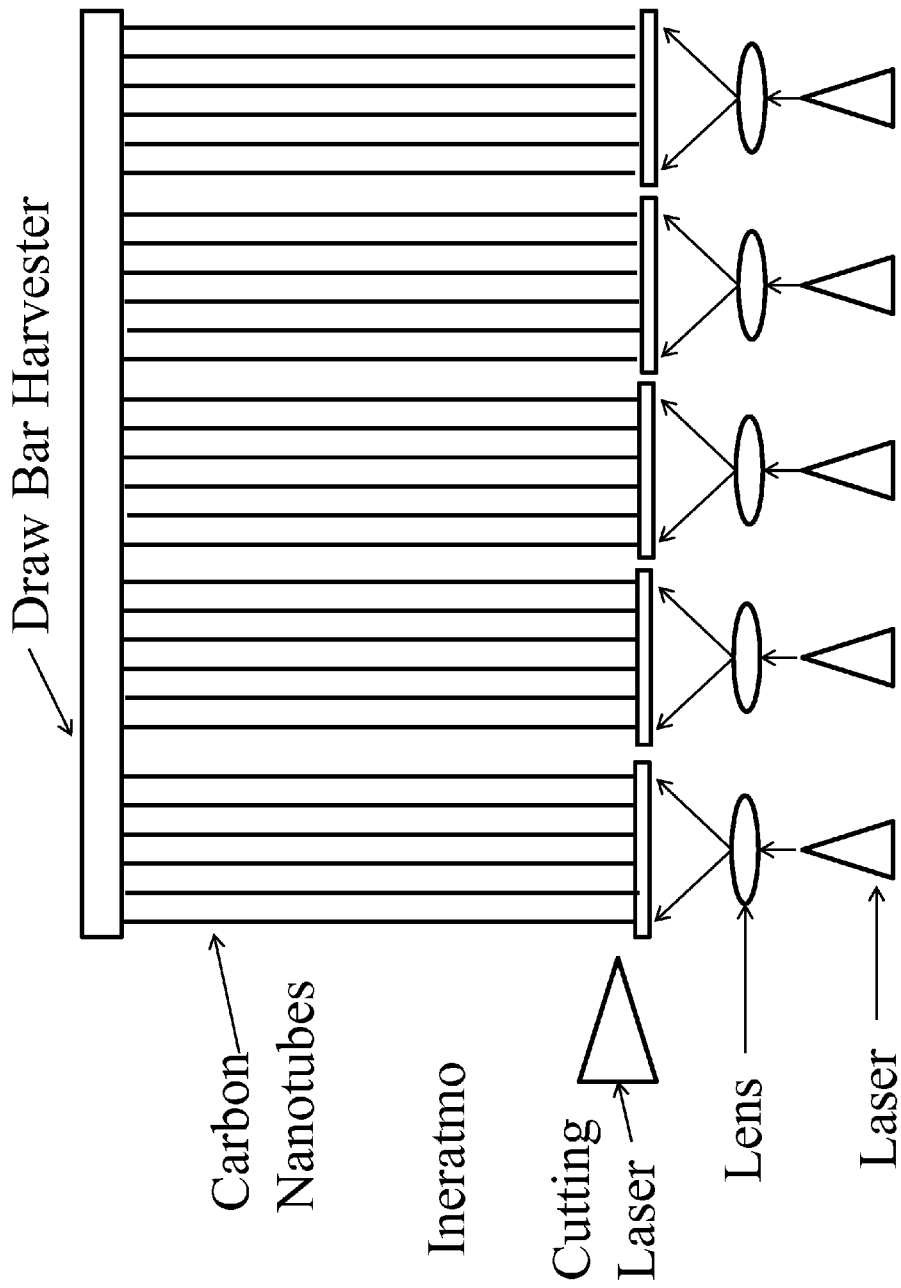
FIG. 12 is an industrial embodiment of the present invention wherein laser techniques (as in FIGS. 1-3, 7, 8 and in some cases 9) are used to transport feedatoms to catpars residing on a large array of substrates growing NTs.

The inventor envisions transforming the present invention into an industrial process in which a vast amounts of long, highq NTs are created. FIG. 12 illustrates schematically this vision. FIG. 12 shows the side view inside a reaction chamber. Five assemblies each consisting of a substrate with catpars arranged on it sitting above a laser. This configuration could facilitate the BM (FIG. 1), FV (FIG. 2), WT (FIG. 3), IL (FIG. 7) and AL (FIG. 8) embodiments. In between is a lens that transports the photons from the laser to the backside of the substrate. Above the front surface of the five substrates is a "draw bar harvester". When the NT growth has progressed for a time, the bar moves down, attaches to the growing NT surface and then rises in cadence with the growth. When the NTs are ready to be harvested, an industrial laser cuts the NTs off, above the substrate and catpar levels. The bar then transports the harvested NTs out of the reaction chamber to a processing location.

Figure 13:
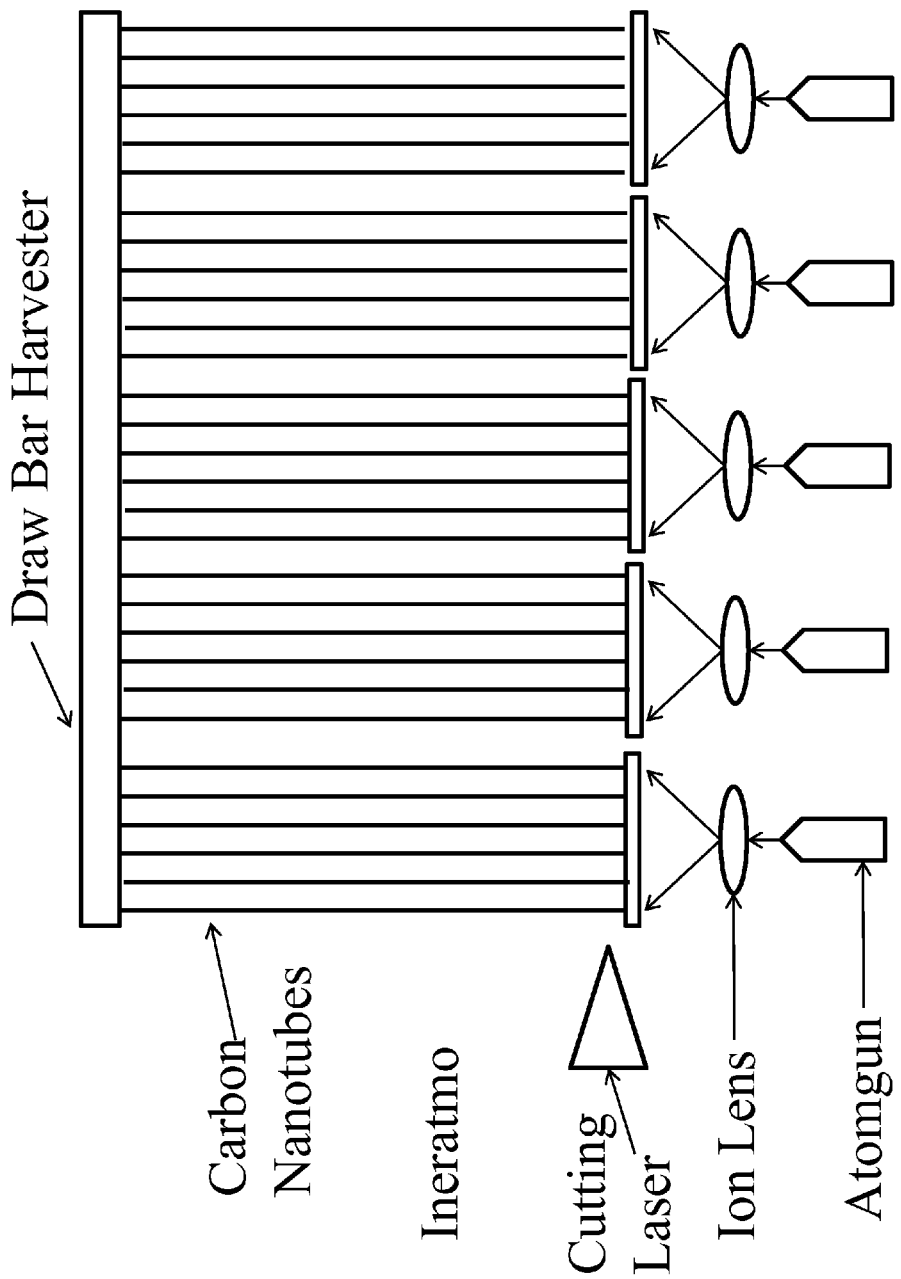
FIG. 13 is an industrial embodiment of the present invention wherein atomgun techniques (as in FIGS. 4-6, and in some cases 9) are used to transport feedatoms to catpars residing on a large array of substrates growing NTs.

FIG. 13 illustrates another embodiment of an industrial process for the Trekking Atom Nanotube Growth Technology. The difference is that the laser energy source of the FIG. 12 system is replaced by the atomgun energy source of the AB (FIG. 4), AA (FIG. 5), MA (FIG. 6) and BT (FIG. 9) embodiments. Five assemblies each consisting of a substrate with catpars arranged on it sitting above an atomgun. In between is an ion lens that steers the feedatom ion beam from the atomgun to appropriate trajectories toward the backside of the substrate.

Figure 14:
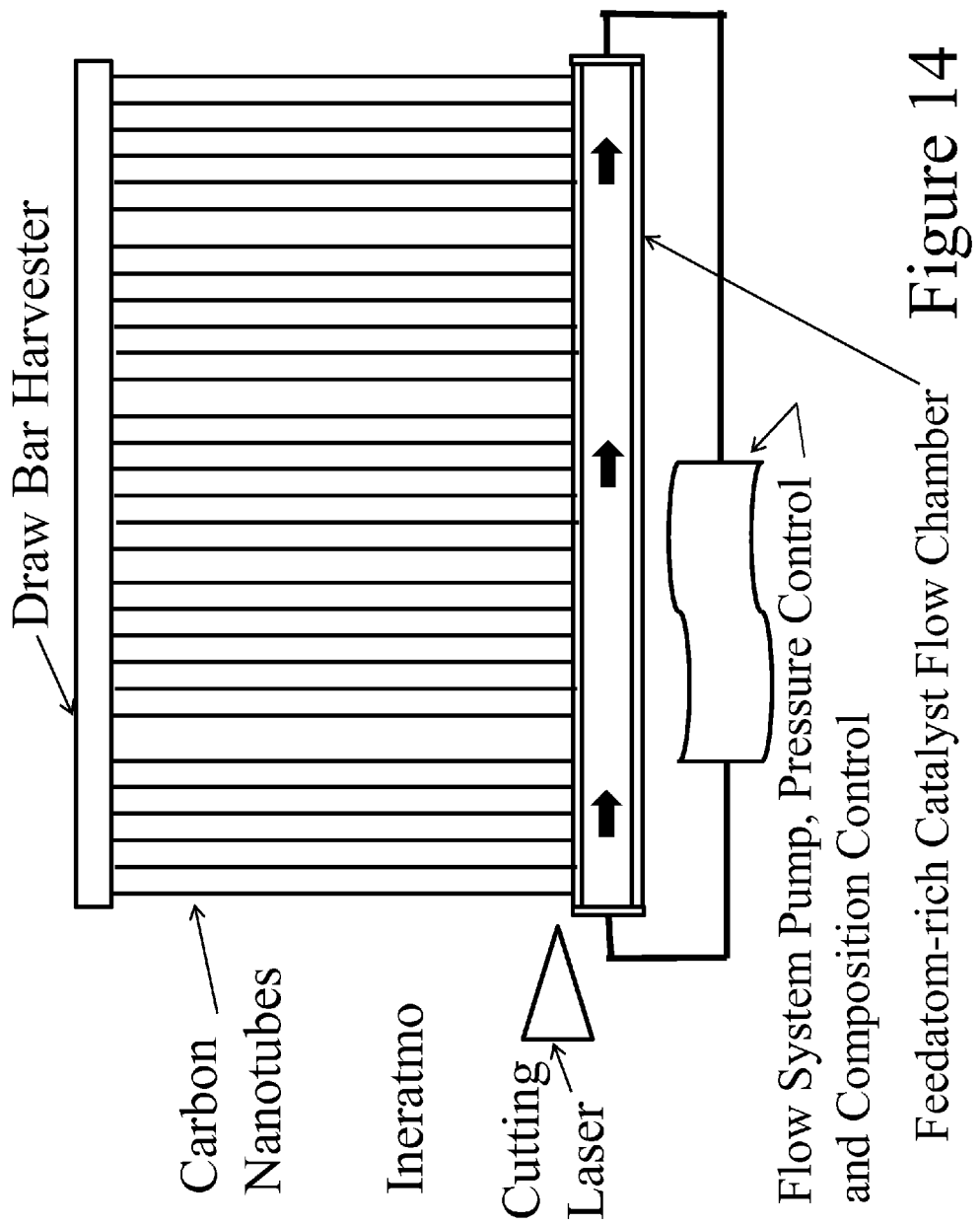
FIG. 14 is an industrial embodiment of the present invention wherein a flowing catalyst (FIG. 10) is transporting feedatoms to catpars residing on a large array of substrates growing NTs.

FIG. 14 illustrates another embodiment of an industrial process for the Trekking Atom Nanotube Growth Technology. The difference is that the flowing catalyst feedatom transport system of the CF (FIG. 10) and FT (FIG. 11) embodiments replaces either the laser of FIG. 12 or the atomgun of FIG. 13.

The industrialization concepts described above and illustrated in FIGS. 12-14 run continuously and are modular so can be scaled up to any size desired.

Figure 15:
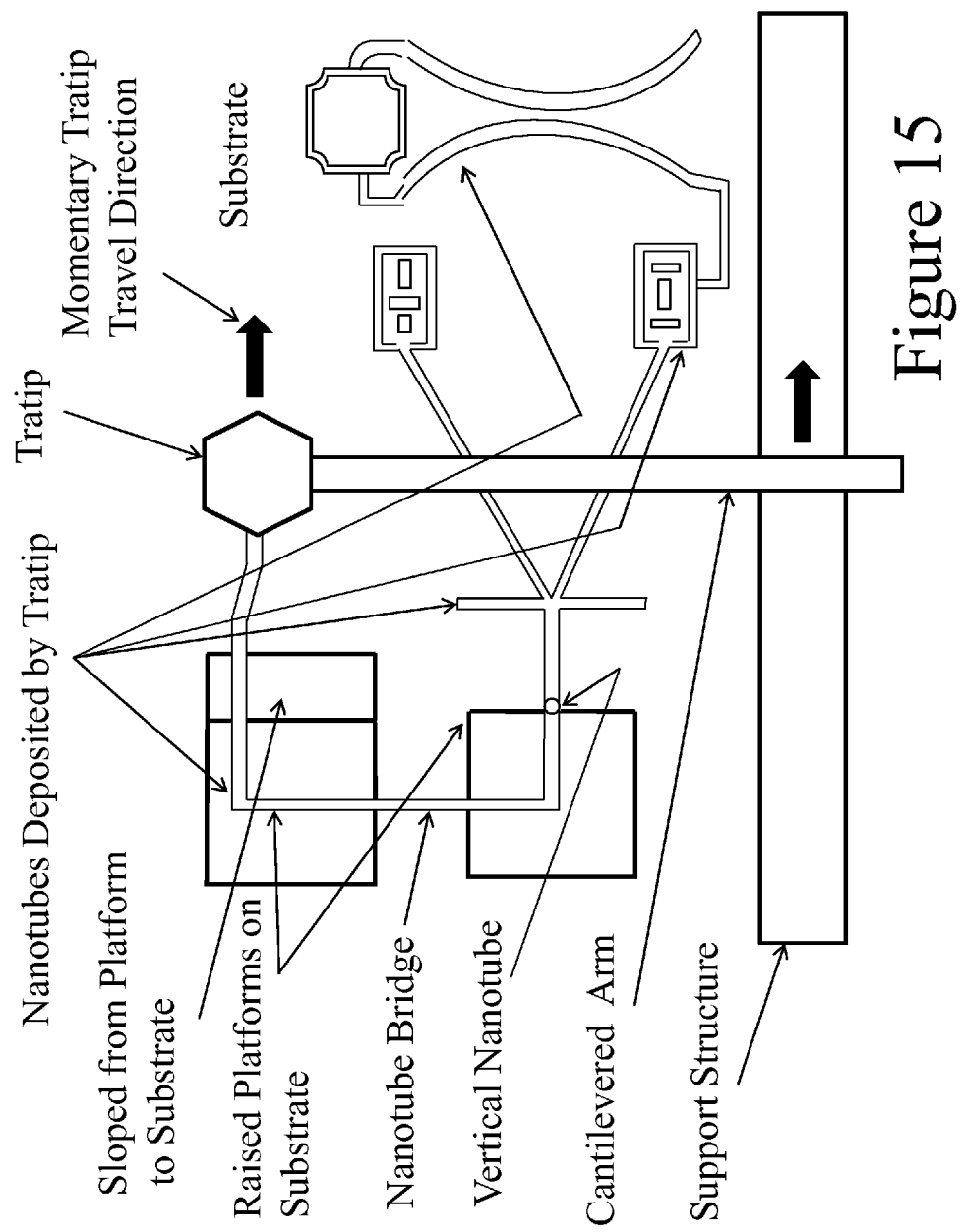
FIG. 15 is an industrial embodiment of the present invention wherein a tratip (as in FIGS. 3, 9 and 11), mounted on a cantilever arm is growing and depositing NTs on a substrate (as seen from above) in three dimensions to create a circuit or structure out of NTs.

FIG. 15 is an overhead view of another embodiment of an industrial process for the Trekking Atom Nanotube Growth Technology, in this case a tratip system. The tratip head assembly, to which the tratip system attaches, is mounted on a cantilever arm and moves in three dimensions: X and Y (in the plane of the substrate surface/page) by the motions of the support structure and cantilever arm and the Z direction by the tratip moving vertically (with respect to the plane of the substrate surface/page). Additionally, to efficiently deposit vertical NTs, the tratip head assembly also rotates in two axes. Two raised platforms and a sloped surface on the drawing facilitate the vertical NT and NT bridge structure features. The varied forms of the patterns of NTs deposited on the surface illustrate the potential capabilities of this system as envisioned by the inventor.

Achieving industrial-scale manufacturing of long, highq NTs means that these materials will become increasingly plentiful and inexpensive. In the case of CNTs, with their remarkable tensile strength and electrical properties, new ways of building existing commodities will be developed and new products will be invented using the superior material properties. CNT high strength material, possibly exceeding in tensile strength all existing materials by an order of magnitude or more, will revolutionize life on Earth. Additionally, with patterned growth technology, CNT electrical components created at the nanometer scale lengths will enable smaller, lower power integrated circuits and will transform human society. The most extreme example of the benefits may be that high strength CNTs will enable the Space Elevator, thereby opening the resources of space to mankind in the form of enhanced Earth observation, space-based solar power, asteroid mining, planetary defense and colonization of the moons and planets of our solar system!

It will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. An apparatus for nanotube growth comprising: an emrad source capable of emitting emrad that can energize a feedatom to trek; a substrate capable of transmitting emrad; wavides incorporated within the substrate capable of transmitting emrad; a feedlayer on the front side of the substrate capable of absorbing the emrad; feedatoms in the feedlayer capable of being energized, by absorbing emrad, to trek; catpars on the front side of the feedlayer capable of growing nanotubes with feedatoms; and an ineratmo that is the environment adjacent to the front side of the feedlayer.

2. The apparatus for nanotube growth according to claim 1, wherein the substrate or wavide includes structures capable of generating plasmons; said plasmons are capable of traversing the substrate or wavide to the feedlayer, and energizing the feedatoms to trek to the catpar.

3. The apparatus for nanotube growth according to claim 1, wherein the substrate or wavide includes a feedvoir instead of a feedlayer; and the feedvoir is capable of replenishment by a retun.

4. The apparatus for nanotube growth according to claim 1, wherein the emrad source, separate from the substrate, is selected from the group consisting of a laser, a light emitting diode, a fluorescent flashlamp, or an incandescent flashlamp.

5. The apparatus for nanotube growth according to claim 1, wherein the emrad source, fabricated as a part of the substrate, is selected from the group consisting of a light emitting diode, or a laser; and additional energy amplification comprises an optical amplifier fabricated as a part of the substrate.

6. The apparatus for nanotube growth according to claim 2, wherein the plasmon source is selected from the group consisting of a plasmon source capable of generating plasmons by: emrad propagating through the substrate or wavide, direct current injection in the substrate or wavide, or current injection into quantum wells in the substrate or wavide.

7. An apparatus for nanotube growth comprising: an emrad source capable of emitting emrad that can energize a feedatom to trek; a tratip substrate capable of transmitting emrad; wavides incorporated within the tratip substrate capable of transmitting emrad; a feedvoir on the front side of the tratip substrate; feedatoms in the feedvoir capable of being energized, by absorbing emrad, to trek; a catpar on the front side of the feedvior capable of growing nanotubes with feedatoms; an interatmo as the atmospheric environment of the apparatus; a tratip apparatus capable of three dimensional motion across a surface adjacent to the tratip, and depositing nanotubes, growing from the tratip, across the surface.

8. The apparatus for nanotube growth according to claim 7, wherein structures are included in the tratip substrate or wavides capable of generating plasmons; said plasmons are capable of traversing the tratip substrate or wavide to the feedvoir and energizing feedatoms to trek to the catpar.

9. An apparatus for nanotube growth according to claim 7, wherein the emrad source, separate from the tratip substrate, is selected from the group consisting of a laser, a light emitting diode, a fluorescent flashlamp, or an incandescent flashlamp.

10. An apparatus for nanotube growth according to claim 7, wherein the emrad source, fabricated as a part of the substrate, is selected from the group consisting of a light emitting diode, or a laser; and additional energy amplification comprises an optical amplifier fabricated as a part of the substrate.

11. An apparatus for nanotube growth according to claim 8, wherein the plasmon source is selected from the group consisting of a plasmon source capable of generating plasmons by: emrad propagating through the tratip substrate or wavide, direct current injection in the tratip substrate or wavide, or current injection into quantum wells in the tratip substrate or wavide.

12. The apparatus for nanotube growth according to claim 7, wherein the tratip is configured for depositing nanotubes, grown from the tratip, in three dimensional patterns on an adjacent surface.

13. A method for nanotube growth comprising the following steps of: 1) forming an appropriately contoured substrate incorporating wavides in the substrate; 2) laying down a feedlayer onto the substrate; 3) completing a growth assembly by laying down a thin film of catalyst on the surface of the feedlayer; 4) forming catpars from the thin catalyst film; 5) installing the assembly in a reaction chamber and sealing the chamber; 6) replacing the atmosphere in the reaction chamber with an ineratmo; 7) starting the emrad source to energize feedatoms to trek to the catpars; and 8) optimizing the physical properties of the assembly, emrad source, feedatoms, catalyst, catpars, and interatmo to optimize growth.

14. A method of nanotube growth, according to claim 13 wherein steps 8 and 9 are replaced by: 8) starting a plasmon source to energize feedatoms to trek to the catpar; 9) optimizing the physical properties of the assembly, plasmon source, feedatoms, catalyst, catpars and interatmo to optimize growth.

15. A method for nanotube growth comprising the following steps of: 1) forming a tratip substrate incorporating wavides in the substrate; 2) laying down a feedvoir in the substrate; 3) completing a tratip growth assembly by laying down a thin film of catalyst on the surface of the substrate over the feedvoir; 4) forming a catpar on the tratip from the thin catalyst film; 5) installing the tratip growth assembly onto a tratip apparatus adjacent to the surface upon which nanotubes are to be deposited; 6) mounting the assembly in a reaction chamber and sealing the chamber; 7) replacing the atmosphere in the reaction chamber with an ineratmo; 8) starting an emrad source to energize feedatoms to trek to the catpar; and 9) optimizing the physical properties of the assembly, emrad source, feedatoms, catalyst, catpars, and interatmo to optimize growth.

16. A method of Nanotube growth, according to claim 14 wherein steps 8 and 9 are replaced by: 8) starting a plasmon source to energize feedatoms to trek to the catpar; 9) optimizing the physical properties of the assembly, plasmon source, feedatoms, catalyst, catpars, and interatmo to optimize growth.

* * * * *